United States Patent [19]

Grohmann

[11] 3,922,609

[45] Nov. 25, 1975

[54] DIGITAL AUTOMATIC FREQUENCY CONTROL LOOP FOR A LOCAL OSCILLATOR

[75] Inventor: Lothar Grohmann, Pforzheim, Germany

[73] Assignee: International Standard Electric Corporation, New York, N.Y.

[22] Filed: June 17, 1974

[21] Appl. No.: 480,069

[30] Foreign Application Priority Data

July 3, 1973 Germany ............................ 2333851

[52] U.S. Cl. .................................. 325/423; 331/1 A

[51] Int. Cl.² .............................................. H04B 1/16

[58] Field of Search ........... 325/416, 418, 420, 422, 325/423, 464; 331/1 A; 334/16

[56] References Cited

UNITED STATES PATENTS 3,185,938 5/1965 Pelosi .................................. 331/1 A 3,488,605 1/1970 Schwartz ............................ 331/1 A 3,495,195 2/1970 Ribour ................................ 325/422

*Primary Examiner*—George H. Libman

*Attorney, Agent, or Firm*—John T. O'Halloran; Menotti J. Lombardi, Jr.; Vincent Ingrassia

[57] ABSTRACT

The invention provides a method and apparatus for automatically controlling the local-oscillator frequency in a superheterodyne receiving section of a sound reproduction system through the use of a digital a.f.c. circuit. A frequency is derived from the local oscillator frequency and compared with a modulator frequency. The discriminator forms a dc voltage corresponding to the difference between the local oscillator frequency and the discriminator frequency. A varactor in the local oscillator is controlled with the dc voltage such that the local oscillator frequency varies opposite the direction of control of the dc voltage.

11 Claims, 6 Drawing Figures

DIGITAL AUTOMATIC FREQUENCY CONTROL LOOP FOR A LOCAL OSCILLATOR

BACKGROUND OF THE INVENTION

The present invention relates to a method for automatically controlling the frequency of the local oscillator in the superheterodyne receiving section of an image- and/or sound-reproduction arrangement, which frequency is adjusted with a tuning arrangement and which superheterodyne receiving section contains an intermediate-frequency circuit for transmitting a stable intermediate frequency and an automatic frequency control loop with a frequency discriminator tuned to a stable frequency. In a first step, a frequency is derived from the local oscillator frequency and compared with the discriminator frequency. In a second step, the discriminator forms a dc voltage corresponding to the difference between the local oscillator frequency and the discriminator frequency. In a third step, a varactor in the local oscillator is controlled with the dc voltage in such a manner that the frequency derived from the local oscillator varies opposite the direction of control of the dc voltage generated by the frequency discriminator.

In most cases, image- and/or sound-reproduction arrangements, particularly radio and television receivers, are tuned to a desired station by hand according to a dial. Frequently, especially if shortwave or VHF stations are to be received, it is difficult for less skilled persons to bring the tuning arrangement in the receiver in a suitable position in which distortion-free reception is possible for a longer period of time.

Therefore, many receivers of that kind was frequency control arrangements which are designed in the manner of an automatic frequency control loop. A known method for automatic frequency control, which is used in these known afc loops, takes advantage of the deviation of the intermediate frequency, formed in a mixer of the receiving section, from the frequency of a frequency discriminator provided for demodulating the intermediate frequency, which discriminator frequency is set to the nominal value of the intermediate frequency. Through the frequency deviation, a dc voltage depending on the relative frequency difference is obtained in the frequency discriminator; it is used to control a varactor in the resonant circuit of the local oscillator in the receiver directly or via matching intermediate stages. In these known methods, the deviation of the intermediate frequency from its nominal value is a measure of the frequency drift of the station being received or of the receiver's local oscillator. A disadvantage of this known afc method is a pulling effect which occurs while a desired station is being tuned in. As a result, during tuning or automatic station search, a station having a low incoming-signal level may be skipped unnoticed, or the tuning may be set to the beginning or end of the lock-in range of the afc arrangement and in case of a slight drift of the frequency of the station or of the local oscillator in the unfavorable direction, the reproduction may be greatly distorted or even jumping over the neighboring station may occur. Such jumping is likely especially in case of deep fades or of variations in the received voltage. Disconnecting the afc loop during station search, which is particularly necessary if the receiver is to be tuned to a weak station, is frequently regarded as troublesome.

SUMMARY OF THE INVENTION

It is an object of the present invention to provide an automatic frequency control method for transmitter tuning in image- and/or sound-reproduction arrangements which avoids the aforementioned disadvantages and is independent of the field strength received from the transmitter to which the receiver is to be tuned.

According to a broad aspect of the invention there is provided a method for automatically controlling the frequency of a local oscillator in the superheterodyne receiving section of an image and/or sound-reproduction arrangement, which frequency is adjusted with a tuning arrangement, and which superheterodyne receiving section contains an intermediate frequency circuit for transmitting a stable intermediate frequency and an automatic frequency control loop with a frequency discriminator tuned to a stable frequency wherein a frequency is derived from the local oscillator and compared with the discriminator frequency, the discriminator forms a dc voltage corresponding to the difference between the local oscillator frequency and the discriminator frequency, and the varactor in the local oscillator is controlled with the dc voltage such that the frequency derived from the local oscillator varies in a direction opposite to the direction of control of said dc voltage generated by said frequency discriminator, wherein the improvement comprises: injecting the continuous waves of the local oscillator output into the automatic frequency control loop; dividing said continuous waves into an uninterrupted sequence of equally long wave trains whose number of single waves is the difference between the comparative values of the transmitter frequency adjusted to the tuning arrangement and the positive or negative value of the intermediate frequency referenced to a decade value of the transmitter frequency; and forming a single wave for each wave train whereby the discriminator frequency is equal to the decade value of the transmitter frequency adjusted.

According to a further object of the invention there is provided an improved receiving section of an image- and/or sound-reproduction arrangement wherein there is provided at least one radio frequency input circuit, one local oscillator, one mixer, one intermediate frequency circuit having a predetermined intermediate frequency, one demodulator and one tuning arrangement for setting the frequency of the local oscillator and the pass frequency of the radio frequency input circuit and wherein there is provided an automatic frequency control loop having a frequency discriminator between the output and one automatic frequency control input of the local oscillator wherein the improvement comprises: a resettable digital pulse counter having a reset input; an adding arrangement; an adjustable comparator; a constant-value circuit, the outputs of said pulse counter and said constant value circuit connected to the inputs of said adding arrangement, said reset input coupled to the output of said comparator; and a common manual tuning device for adjusting said comparator arrangement and said tuning arrangement.

In a modification of the method, the continuous waves divided into equally long wave trains are formed from the continuous waves of the frequency of the local oscillator by frequency division at a ratio of 1:M, and the discriminator frequency is equal to the decade value of the adjusted transmitter frequency, which decade value is divided at the same 1:M ratio.

For carrying out the modified method, the receiving section according to the invention has, between the output of the local oscillator and the input of the digital pulse counter, a frequency divider with a fixed division ratio of 1:M. In addition, the numerical value of the discriminator frequency is the Mth part of the decade value of the transmitter frequency preselectable with the tuning device in the same unit of frequency.

To obtain a favorable wave shape for the frequency discriminator in the automatic frequency control loop, a wave shaper is advantageously inserted between the output of the comparator arrangement and the input of the frequency discriminator.

For simplifying the circuit arrangement and/or for input-output matching it is frequently advantageous to insert a code converter between the output of the adding arrangement and the input of the comparator arrangement.

It is known in the art to provide between the output and the tuning input of the local oscillator a tuning loop which consists of a resettable decade counter, a code converter, a preselection switch, and a phase-comparison discriminator with a reference oscillator and in which the frequency of the local oscillator is divided, by preselected oscillation counting, to a derived frequency at a 1:M ratio. In case of a deviation from the reference frequency, the derived frequency generates in the phase-comparison discriminator a control voltage which is dependent on the deviation and controls or adjusts the frequency of the local oscillator.

Consequently, this known operation is a tuning method, unlike the automatic frequency control method according to the invention. The known tuning method has considerable disadvantages. For one thing, it requires a relatively high control voltage for the tuning diodes. Above all, however, the self-adjusting oscillator frequency may substantially differ from the oscillator frequency selected by the frequency-divider setting because the point of intersection of the frequency/-control-voltage characteristic of the local oscillator and the discriminator characteristic determines the local-oscillator frequency and because this point of intersection may be very far from the zero of the discriminator characteristic, which zero is fixed by the frequency preselection. For this reason, the tuning range of this known method is always limited to a relatively narrow band of frequencies.

The automatic frequency control method according to the invention has the advantage of being applicable to frequency ranges of nearly any extension and frequency position. Because of the low control voltage needed, commercially available, economy-priced frequency discriminators can be used. In addition, the automatic frequency control method is independent of local receiving conditions, which is particularly advantageous with mobile receivers and permits easy tuning in any case. Finally, it is possible to combine the preselection device in receivers using the automatic frequency control method according to the invention with a great variety of tuning means for the radiofrequency and oscillator circuits.

The above and other objects of the present invention will be better understood from the follwoing detailed description taken in conjunction with the accompanying drawings, in which:

DESCRIPTION OF THE PREFERRED EMBODIMENTS

Figure 1:
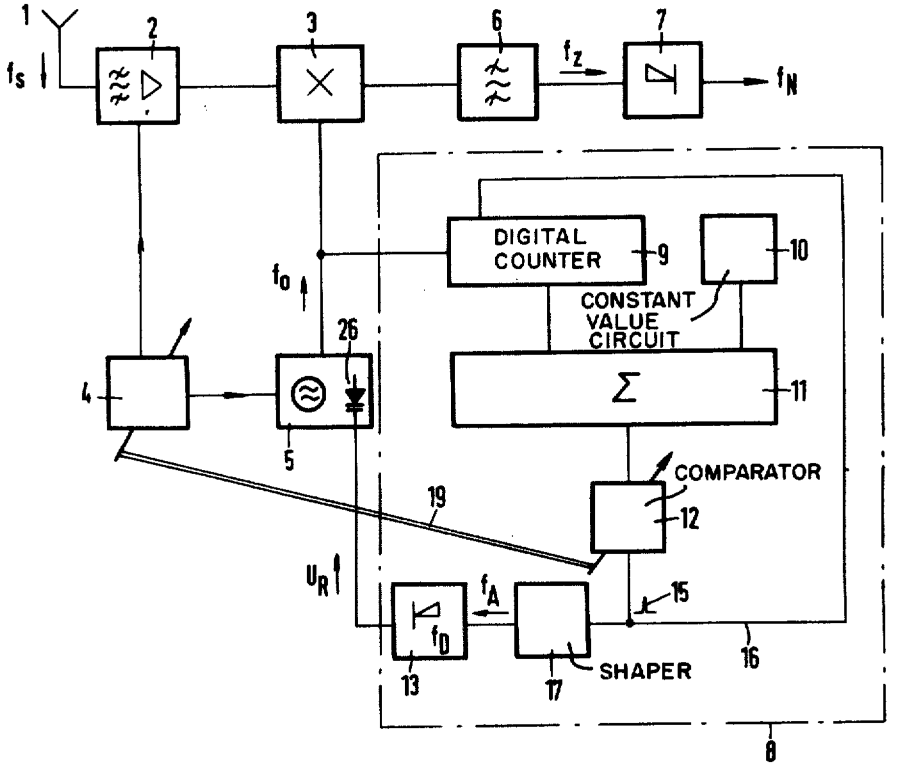
FIG. 1 is a block diagram of a receiving section with an afc loop according to the invention.

An embodiment of a receiving section of an image- and/or sound-reproduction unit, in which the frequency of the local oscillator is automatically controlled by the method in accordance with the invention, is shown schematically in FIG. 1. The oscillations of the transmitter frequency $f_s$, which are applied to an antenna 1 with different field strengths, are amplified in a preferably tunable radio-frequency input circuit (r.f. input circuit) 2 of the receiving section and mixed in a mixer 3 with the frequency $f_o$ of the local oscillator 5, which frequency is set with a tuning arrangement 4. An intermediate-frequency circuit 6 filters, in known manner, out of the output frequencies of the mixer the oscillations with the frequencies falling within the passband $\Delta f_z$, lying on the fixed intermediate frequency $f_z$, amplifies these oscillations and transmits them to a demodulator 7, which forms from these oscillations the low-frequency oscillation (frequency $f_n$). The circuits 2 to 7 are parts of the radio-frequency transmission circuit to commercially available image- and/or sound-reproduction units and are designed in known manner.

The output of the local oscillator is connected to an automatic frequency control loop 8 whose output delivers to the local oscillator a control voltage $U_R$ for automatic frequency control. The local oscillator has, in known manner, an afc input and a voltage-dependent control element, preferably a varactor 26, for controlling the local oscillator frequency. The automatic frequency control loops consists of a resettable digital pulse counter 9 and a constant-value circuit 10, which are both connected to the add inputs of an adding arrangement, as well as of an adjustable comparator arrangement 12 and a frequency discriminator 13.

Figure 2:
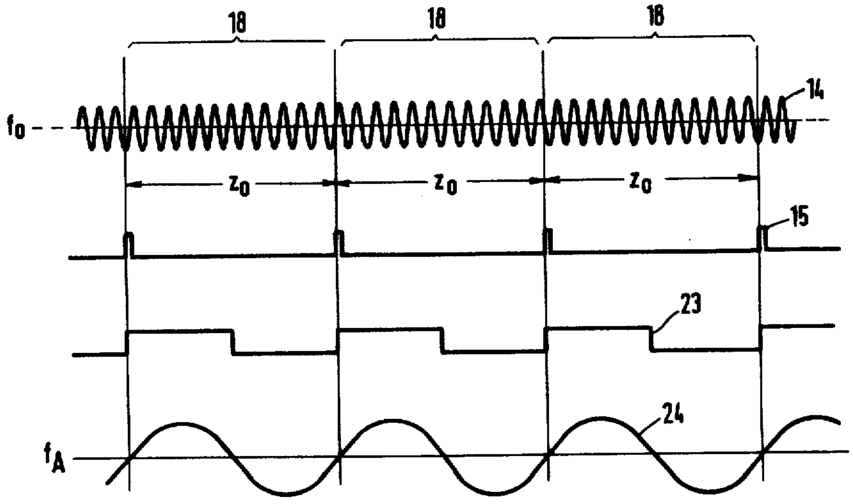
FIG. 2 is a diagram showing the signals in the course of the individual steps of the afc method according to the invention.

The continuous waves 14 (FIG. 2) of the local oscillator 4, whose frequency $f_o$ is preferably determined by the setting of the tuning arrangement, are applied to the mixer 3 and to the input of the digital pulse counter 9, which counts the cycles of the continuous waves. The adding arrangement 11 continuously adds the instantaneous count Z of the pulse counter to a permanently set, positive or negative value K of the constant-value circuit 10, so that the output of the adding arrangement provides the count of the digital counter augmented by the constant K. In the comparator arrangement 12, this value (Z+K) is compared to a comparative value set in the comparator arrangement. As soon as the value (Z+K) at the output of the adder is equal to the comparative value S, the comparator arrangement forms an output signal in the form of a single wave, e.g. a pulse 15 (FIG. 2), which resets the digital pulse counter to zero over the reset line 16 and is simultaneously applied, directly or, more advantageously, via a wave shaper 17, to the input of the frequency discriminator 13.

In the automatic frequency control loop, as a result of the resetting of the pulse counter during the continuous comparison, a sequence of uninterrupted, equally long wave trains 18 is formed from the continuous waves 14.

The comparative value S, set in the comparator arrangement by means of a manual tuning device 19, corresponds to the transmitter frequency $f_s$ to which the receiving section was tuned with the manual tuning device and the tuning arrangement coupled therewith. The value K, set in the constant-value circuit 10, corresponds to the intermediate frequency $f_z$ for which the intermediate-frequency circuit 6 of the receiving section is designed. The comparative value S of a frequency $f_s$ whose magnitude (e.g. $f_s = 89.4$ MHz) consists of the numerical value 89.4 and the unit of frequency E (MHz), is the integral digit sequence ($S = 894$) of the numerical value of the frequency. The associated decade value D (e.g. 0.1) is the integral power of ten $10^n$ ($n = \pm 1, \pm 2, \ldots$) by which the comparative value S must be multiplied in order to obtain the numerical value 89.4 of the frequency in the intended unit of frequency: $f = S \cdot D \cdot E$. *For example, at an intermediate frequency of* 10.7 MHz and a decade value of $D = 0.1$ for the tunable transmitter frequencies, the numerical value of the constant K is equal to the number 107. The constant K is negative if the local-oscillator frequency exceeds the transmitter frequency by the intermediate frequency.

Figure 3A:
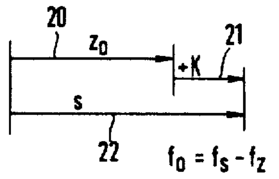
FIGS. 3*a* and 3*b* are diagrams illustrating the relationship between the values S and $Z_0$ if the value K is positive (diagram *a*) and negative (diagram *b*)
Figure 3B:
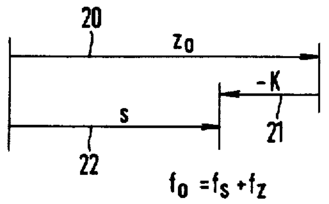

The diagrams *a* and *b* of FIG. 3 show the relationship between the values S, K and $Z_0$. The distance 20 corresponds to the number $Z_0$ of cycles of each wave train 18 (FIG. 2) formed by the method, and the distance 21 to the intermediate frequency or to the value K set in the constant-value circuit 10, while the distance 22 corresponds to the comparative value S of the transmitter frequency set with the manual tuning device 19. In diagram *a*, the local-oscillator frequency is lower than the transmitter frequency by the intermediate frequency, and, therefore, the value K is positive (+K). In diagram *b*, the local-oscillator frequency exceeds the adjusted transmitter frequency by the intermediate frequency, and, therefore, the value K is negative (−K). From the diagrams of FIG. 3 it is apparent that the number $Z_0$ of cycles of each wave train is the difference between the comparative value S of the adjusted transmitter frequency $f_s$ to be received and the permanently set constant K.

Since a pulse 15 is developed at the output of the comparator 12 after each counting cycle of the pulse counter 9 or at each wave train 18, adjustable pulse division at a $1/Z_0$ ratio can be achieved with the arrangement 9 to 12. The pulse train developed at the output of the comparator arrangement and having a frequency $f_a$ derived from the local-oscillator frequency $f_o$ by this pulse division must generally be adapted, in the wave shaper, to the input characteristics of the frequency discriminator 13. The short pulses 15 are stretched, for example, at an approximate 1:1 ratio (pulses 23 of FIG. 2), are passed through a low-pass filter and amplified, so that an approximately sinusoidal oscillation 24 having the derived frequency $f_a$ is applied to the input of the frequency discriminator 13. In case of a uniform unit of frequency (e.g. MHz), the numerical value of the frequency $f_d$ of the frequency discriminator corresponds to the decade value D of the transmitter frequency $f_s$ selectable with the manual tuning device 19.

Figure 4:
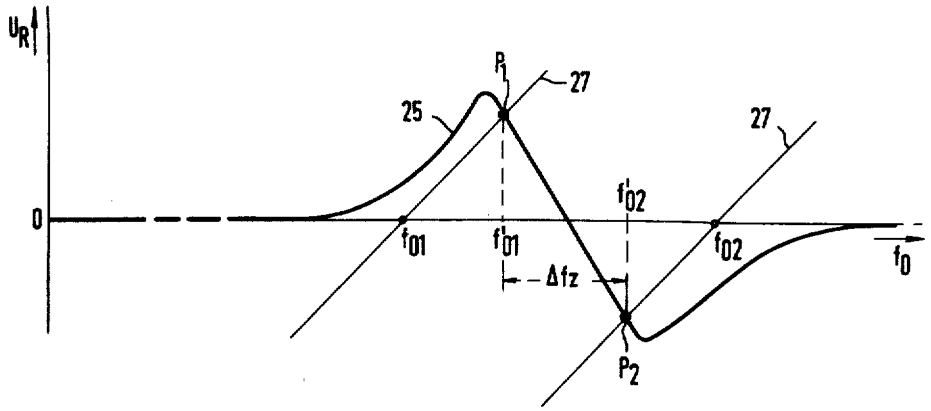
FIG. 4 shows the automatic frequency control characteristics of the local oscillator and the discriminator characteristic referred to the local-oscillator frequency $f_o$, in the control-voltage/local-oscillator frequency coordinate system.

Near the discriminator frequency $f_d$ the frequency discriminator 13 forms, in known manner, an S-shaped characteristic 25 (FIG. 4) which is dependent on the frequency ($f_a$) appearing at its input and has the shape of an output dc voltage $U_R$ depending on the input frequency $f_a$. In the local oscillator 5, this dc voltage $U_R$ is used to control a varactor 26 which controls the frequency of the local oscillator. The automatic frequency control characteristic of the local oscillator, e.g., the dependence of the local-oscillator frequency $f_o$ on the magnitude of the dc voltage $U_R$ at the afc input of the local oscillator, is shown in FIG. 4 by the characteristics 27. The positions of the automatic frequency control characteristics 27 in the afc diagram, which positions are determined by the points of intersection ($f_{o1}$, $f_{o2}$) of the automatic frequency control characteristic 27 and the local-oscillator-frequency axis ($f_o$-axis), depend on the adjustment of the tuning arrangement 4. The diagram of FIG. 4 also shows the discriminator characteristic 25 as a function of the local-oscillator frequency $f_o = Z_o \cdot f_a$.

The point where the discriminator characteristic 25 and the $f_o$-axis intersect and which is also dependent on the tuning position of the tuning arrangement or on the adjustment of the comparator is the local-oscillator frequency $f_o$ for the transmitter frequency $f_s$ adjusted. The accuracy of adjustment of this local-oscillator frequency $f_o$ is determined by the bandwith $\Delta f_z$ of the intermediate-frequency circuit 6, so that the local-oscillator frequency for the transmitter frequency $f_s$ to be received may lie between the frequency values $f_{o1}$ and $f_{o2}$, for example. The operating frequency of the local oscillator follows from the point of intersection ($P_1$, $P_2$) of the automatic frequency control characteristics 27 and the discriminator characteristics 25. Therefore, a relatively coarse adjustment of the local-oscillator frequency or of the position of the automatic frequency control characteristic between the values $f_{o1}$ and $f_{o2}$ by means of the tuning arrangement 4 is sufficient.

Figure 5:
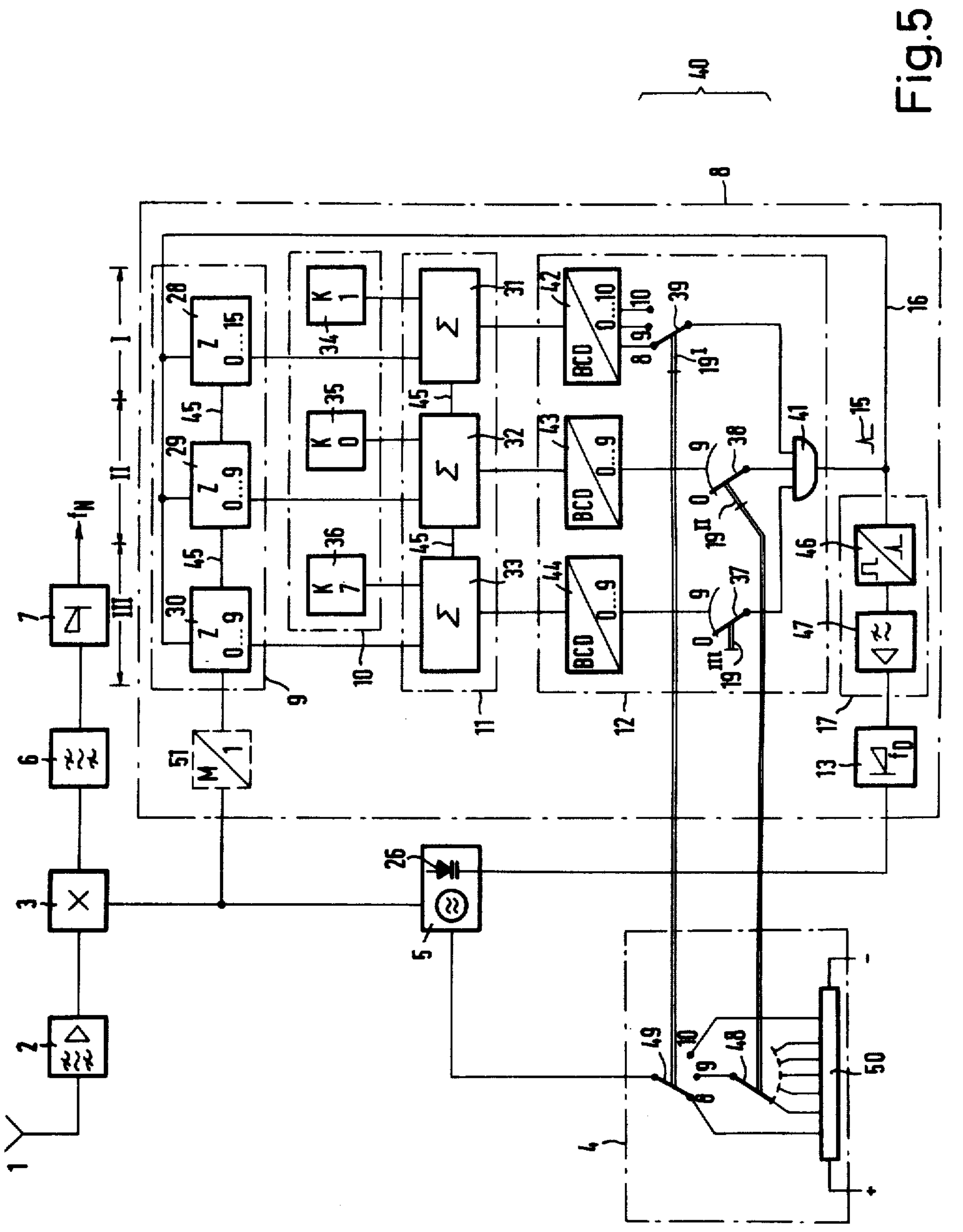
FIG. 5 is another embodiment of a receiving section with an inventive afc loop organized in decades.

FIG. 5 shows another embodiment of an inventive automatic frequency control loop 8 of a receiving section substantially corresponding to FIG. 1. The receiving section is intended, for example, for the reception of VHF stations transmitting on frequencies between 87.5 and 100 MHz. In this example, the automatic frequency control loop is proportioned for three decades I, II, III, with decade II representing the decade of the units place, decade I the decade of the tens place with the digits 8, 9 and 10, and decades III the decade behind the point of the numerical value of the transmitter frequency. In the pulse counter 9 each decade is assigned a decade counter (28, 29, 30) which counts in binary fashion, resets itself automatically after one cycle, and can be read out in the BCD code, for example. Accordingly, the adding arrangement 11 consists of three full adders 31, 32, 33 each having one constant-value block 34, 35, 36 connected thereto.

In the embodiment shown, the comparator arrangement 12 contains for each of the decades II and III a ten-digit switch element 37, 38 and for the decade I a three-digit switch element 39 of a three-decade preselection switch 40 as well as one input of an AND gate 41 per switch. Code converters 42, 43, and 44 are connected between the outputs of the full adders and the switch elements; they convert the BCD coded output information of the full adders to the necessary decimal code.

The lines 45 between the decade counters 28, 29, 30 and between the full adders 31, 32, 33 are transfer lines for the decimal carry. If a signal appears simultaneously at the outputs of the code converters which are selected by the preselection switch 40 and connected to the associated inputs of the AND gate 41 via the switch elements, a coincidence signal 15 is developed at the output of the AND gate or of the comparator arrangement 12; this coincidence signal resets the decade counters over the reset line as described hereinbefore, and is applied to the input of a wave shaper 17. In the example shown, the wave shaper consists of a pulse shaper 46 and a low-pass amplifier 47.

In the embodiment shown, the preselection switch 40, which is designed as a manual tuning device, contains two additional switch elements 48 and 49, one of which, the ten-digit switch element 48, is mechanically coupled to the ten-stage switch element 38 for the decade II, while the other, three-digit switch element 49 is mechanically coupled to the three-digit switch element 39 for the decade I. The switches of these switch elements 48 and 49 take from a voltage divider 50 a step-variable tuning voltage for the varactors in the r.f. input circuit and the local oscillator. In the embodiment of FIG. 5, the two additional switch elements 48 and 49 and the voltage divider 50 form the tuning arrangement 4.

In the individual embodiments of the automatic frequency control loop according to the invention, the number of adjustable decades for the transmitter frequencies to be received depends, on the one hand, on the accuracy of adjustment required and, on the other hand, on the adjusting work the user can be expected to do.

In many cases, the maximum permissible speed of the pulse counter 9 is lower than the local-oscillator frequency $f_o$, or expensive counting and computing blocks for high counting and computing speeds must be used for the decade I in particular. In these cases, a frequency divider 51 (broken line in FIG. 5) which divides the local-oscillator frequency $f_o$ for the automatic frequency control loop at a ratio of 1:M is connected between the output of the local oscillator 5 and the input of the digital pulse counter 9. The frequency divider may be, for example, a fast counting circuit which counts in binary or decimal fashion, or a mixing circuit. With such a frequency divider 51 in the automatic frequency control loop, the frequency $f_d$ of the frequency discriminator 13 must be lower than the necessary discriminator frequency without the use of a frequency divider 51 at a ratio of 1:M, too.

In an embodiment of a receiving section designed, for example, as shown in FIG. 5, the three- or multi-decade switch in the comparator arrangement 12 may be replaced by a coincidence circuit. The coincidence circuit compares the number formed at the outputs of the code converters 42, 43, 44 or at the output of the adding arrangement 11 with a number applied to a second input of the coincidence circuit and set with the manual tuning device 19; the latter number is applied to the second input of the coincidence circuit in the same manner of representation as the numbers appearing at the above-mentioned outputs are applied to the first input of the coincidence circuit. In case of coincidence of the numbers at the two inputs of the coincidence circuit, a coincidence signal 15 is developed at the output of the coincidence circuit.

The number set at the second coincidence input may simultaneously determine the frequency of the local oscillator 5 and the pass frequency of the r.f. input circuit via a tuning arrangement designed as a digital-to-analog converter.

While the principles of the invention have been described above in connection with specific apparatus, it is to be clearly understood that this description is made only by way of example and not as a limitation on the scope of the invention.

What is claimed is:

1. A method for automatically controlling the frequency of a local oscillator in the superheterodyne receiving section of an image-and/or sound-reproduction arrangement, which frequency is adjusted with a tuning arrangement, and which superheterodyne receiving section contains an intermediate frequency circuit for transmitting a stable intermediate frequency and an automatic frequency control loop with a frequency discriminator tuned to a stable frequency wherein a frequency is derived from the local oscillator and compared with the discriminator frequency, the discriminator forms a dc voltage corresponding to the difference between the local oscillator frequency and the discriminator frequency, and a varactor in the local oscillator is controlled with the dc voltage such that the frequency derived from the local oscillator varies in a direction opposite to the direction of control of said dc voltage generated by said frequency discriminator, wherein the improvement comprises:

injecting the continuous waves of the local oscillator output into the automatic frequency control loop;

dividing said continuous waves into an uninterrupted sequence of equally long wave trains whose number of single waves is the difference between the comparative values of the transmitter frequency adjusted to the tuning arrangement and the positive or negative value of the intermediate frequency referenced to a decade value of the transmitter frequency; and forming a single wave for each wave train whereby the discriminator frequency is equal to the decade value of the transmitter frequency adjusted.

2. An improved receiving section of an image-and/or sound reproduction arrangement wherein there is provided at least one radio frequency input circuit, one local oscillator, one mixer, one intermediate frequency circuit having a predetermined intermediate frequency, one demodulator and one tuning arrangement for setting the frequency of the local oscillator and the pass frequency of the radio frequency input circuit and wherein there is provided an automatic frequency control loop having a frequency discriminator between the output and one automatic frequency control input of the local oscillator wherein the improvement comprises:

a resettable digital pulse counter having a first reset input and a second input coupled to said local oscillator;

an adding arrangement;

an adjustable comparator;

a constant-value circuit, the outputs of said pulse counter and said constant-value circuit connected to the inputs of said adding arrangement, said reset input coupled to the output of said comparator;

a common manual tuning device for adjusting said comparator arrangement and said tuning arrangement; and a wave shaper coupled between the output of said comparator arrangement and the input of said frequency discriminator.

3. A receiving section according to claim 2 wherein the value in said constant-value circuit equals the value of the intermediate frequency of said intermediate frequency circuit.

4. A receiving section according to claim 3 wherein the value of the frequency of said frequency discriminator is equivalent to the value of the transmitter frequency, preselectable with the manual tuning device.

5. A method according to claim 1 wherein the continuous waves divided into equally long wave trains are formed from the continuous waves of the output of said local oscillator by frequency division at a ratio of 1:M and that the discriminator frequency is equal to the decade value of the adjusted transmitter frequency, which value is divided at the same 1:M ratio.

6. A receiving section according to claim 3 further including a frequency divider having a fixed division ratio of 1:M inserted between the output of said local oscillator and the input of said digital pulse counter.

7. A receiving section according to claim 4 wherein said wave shaper comprises a pulse-shaping stage and a low-pass amplifier.

8. A receiving section according to claim 4 further including a code converter coupled between the output of said adding arrangement and the input of said comparator arrangement.

9. A receiving section according to claim 8 wherein said comparator arrangement is a coincidence circuit.

10. A receiving section according to claim 8 wherein said comparator arrangement comprises the multi-digit switch elements of a multi-decade preselection switch and an AND circuit.

11. A receiving section according to claim 10 wherein the automatic frequency control loop includes, for each adjustable decade of the transmitter frequency to be received, a divider branch which is coupled in parallel with other divider branches comprising a decade counter, a full-adder, a constant-value block, a code converter and a comparator element.

* * * * *